UNITED STATES PATENT OFFICE 2,180,083

RUBBERLIKE POLYMERIZATION PRODUCTS FROM VINYL CARBAZOLE AND SOLID POLYMERIZED ISOBUTYLENE

Martin Mueller-Cunradi and Walter Daniel, Ludwigshafen-on-the-Rhine, Germany, assignors to I. G. Farbenindustrie Aktiengesellschaft, Frankfort-on-the-Main, Germany No Drawing. Application January 7, 1938, Serial No. 183,797. In Germany April 14, 1937

3 Claims. (Cl. 260—42)

The present invention relates to rubberlike polymerization products and a process of producing same.

We have found that rubberlike polymerization products are obtained by polymerizing vinyl carbazole in the presence of solid, highly polymerized isobutylene. It is preferable to roll monomeric vinyl carbazole into the polymerized isobutylene and to heat the resulting product for some time. The procedure may be, however, that solid polymerized isobutylene or a solution of polymerized isobutylene is added to vinyl carbazole also in dissolved form.

In the said manner, even when using small amounts of vinyl carbazole, as for example 2 per cent, there is obtained after heating a polymerization product having higher tensile strength, lower tensile extension, increased hardness and also somewhat higher recoil elasticity than polymerized isobutylene alone. A polymerization product having such a small porportion of vinyl carbazole may be withdrawn from the press while hot and retains its shape, whereas pure polymerized isobutylene under the same conditions changes its shape even after storage for a few hours. Larger amounts of vinyl carbazole may also be used. By increasing the proportion of vinyl carbazole, polymerization products of increasing hardness and decreasing extension are obtained.

The following table gives the values obtained by testing the mechanical properties of pure polymerized isobutylene and of interpolymerization products of polymerized isobutylene and vinyl carbazole according to this invention. The polymerization is effected by heating to 151° C. for one hour. The mechanical properties listed in the table are as follows:

A=tensile strength in kilograms per square centimeter
B=tensile extension in per cent
C=tension (modulus) at 300 per cent
D=tension (modulus) at 500 per cent
E=recoil elasticity
F=Shore hardness in degrees at 20° C.

Table

| | A | B | C | D | E | F |
|---|---|---|---|---|---|---|
| Polymerized isobutylene | 70 | 1,280 | 3 | 3 | 9 | 40 |
| Polymerized isobutylene+2 per cent of vinyl carbazole | 77 | 1,110 | 5 | 6 | 9 | 40 |
| Polymerized isobutylene+7.5 per cent of vinyl carbazole | 92 | 1,080 | 5 | 6 | 10 | 50 |
| Polymerized isobutylene+20 per cent of vinyl carbazole | 108 | 895 | 6 | 16 | 11 | 50 |

What we claim is:

1. A process of producing rubberlike polymerization products, which comprises polymerizing vinyl carbazole in the presence of solid, highly polymerized isobutylene.

2. A process of producing rubberlike polymerization products, which comprises incorporating vinyl carbazole with solid, highly polymerized isobutylene and heating the mixture obtained.

3. Rubberlike polymerization products obtained by polymerizing vinyl carbazole in the presence of solid, highly polymerized isobutylene.

MARTIN MUELLER-CUNRADI.
WALTER DANIEL.